Patented Sept. 29, 1931

1,825,536

UNITED STATES PATENT OFFICE

MASAO MIYAKE, OF YEHIME-KEN, JAPAN

PROCESS OF REDUCING THE QUANTITY OF SULPHUROUS ACID GAS SET FREE FROM COPPER GLANCE ON ITS ROASTING

No Drawing. Application filed October 18, 1929, Serial No. 400,733. Renewed August 24, 1931.

This invention relates to a process of reducing the quantity of sulphurous acid gas set free from copper glance on its roasting in copper metallurgy and has for its object to reduce the quantity of injurious sulphurous acid gas set free from copper glance on the roasting of copper glance.

My process consists in roasting copper glance in a condition of a mixture with red earth and bone-ash, which mixture is prepared by mixing a certain quantity of powdered copper glance with a certain quantity of a mixture of red earth and bone-ash, which is prepared by mixing a certain quantity of red earth screened and dried in the sun with a certain quantity of bone-ash powdered and dried by means of a mixer.

In carrying out the invention, I prefer to use the ingredients in about the following proportions—viz, 827–1240 pounds of copper glance and 83–165 pounds of a mixture of red earth and bone-ash by equal part or seven parts of red earth and three parts of bone-ash by weight. Red earth and bone-ash are mixed in the above mentioned proportion and then are mixed with copper glance. When the mixture is heated up to a temperature above 600° C., sulphurous acid gas produced from copper glance as it becomes roasted will partly be absorbed by other ingredients of the mixture, so that the quantity of sulphurous acid gas set free will diminish.

In my test the red earth has been found to analyze as follows:—silica 44%, alumina 38%, iron oxide 4.5%, other matter 13.5%.

With the view of the above result, we have found, by various experiments, that red earth is effective to promote the action of bone-ash on the roasting of copper ore, as it contains a relatively large quantity of iron, while the organic matter contained in it is of small quantity.

In another test, a mixture of copper glance, red earth and bone-ash in a porcelain boat is heated up to a temperature about 600° C. for an hour in a porcelain tube, introducing air at a certain velocity (one litre per hour) and sulphurous acid gas set free is measured and the following result is obtained:—

| Mixed ingredients | Copper glance | Red earth | Bone-ash |
|---|---|---|---|
| Mixed proportion (gramme) | 0.5 | 0.005 | 0.01 |
| Sulphurous acid gas set free % | 53.12 | | |

In my further test, sulphurous acid gas set free is measured by heating copper glance alone or a mixture of copper glance and red earth under the same condition as the above test and the following result is obtained:—

| Mixed ingredients | Copper glance alone |
|---|---|
| Mixed proportion (gramme) | 0.5 |
| Sulphurous acid gas set free % | 58.75 |

| Mixed ingredients | Copper glance | Red earth |
|---|---|---|
| Mixed proportion (gramme) | 0.5 | 0.15 |
| Sulphurous acid gas set free % | 57.56 | |

From the above test, it will be seen that the quantity of sulphurous acid gas set free from copper glance on its roasting is less when it is roasted in a condition of a mixture with red earth and bone-ash, in comparison with that set free when it is roasted singly or in a mixture with red earth. Sulphurous acid gas is harmful for human body and causes the corrosion of metal and is also injurious for the crops and trees, so that the disposition of sulphurous acid gas set free from copper glance has been a considerable trouble in copper metallurgy. My process brings about an effect for preventing the injury upon animals and plants by considerably reducing the quantity of sulphurous acid gas set free from copper glance on its roasting.

Having now particularly described and ascertained the nature of my said invention and in what manner the same is to be performed, I claim:—

A process of reducing the quantity of sulphurous acid gas set free from copper glance on its roasting, consisting in roasting copper glance in the condition of a mixture of 827–1240 pounds of copper glance and 83–165 pounds of a mixture of red earth and bone-ash comprising 5–7 parts of red earth and 5–3 parts of bone-ash by weight, as described.

In testimony whereof I affix my signature.

MASAO MIYAKE.